United States Patent [19]

Kos et al.

[11] 4,193,005
[45] Mar. 11, 1980

[54] MULTI-MODE CONTROL SYSTEM FOR WIND TURBINES

[75] Inventors: Joseph M. Kos, Holyoke, Mass.; John P. Patrick, South Windsor; Kermit I. Harner, Windsor, both of Conn.

[73] Assignee: United Technologies Corporation, Hartford, Conn.

[21] Appl. No.: 934,658

[22] Filed: Aug. 17, 1978

[51] Int. Cl.$^2$ .............................................. F03D 9/00
[52] U.S. Cl. ......................................... 290/44; 290/55
[58] Field of Search ....................... 290/43, 44, 54, 55; 415/17; 416/30, 35, DIG. 4

[56] References Cited

U.S. PATENT DOCUMENTS

| | | | |
|---|---|---|---|
| 2,666,149 | 1/1954 | Fumagalli | 290/44 |
| 2,795,285 | 6/1957 | Champney | 416/35 |
| 3,639,076 | 2/1972 | Rowen | 416/30 |
| 3,932,058 | 1/1976 | Harner et al. | 416/30 X |
| 4,006,925 | 2/1977 | Scherer | 290/55 |
| 4,160,170 | 7/1979 | Harner et al. | 290/44 |

Primary Examiner—Gene Z. Rubinson
Assistant Examiner—W. E. Duncanson, Jr.
Attorney, Agent, or Firm—Donald F. Bradley

[57] ABSTRACT

A multi-mode electronic wind turbine control system establishes a reference blade angle for a two-bladed, horizontal axis, variable pitch wind turbine rotor, the blade angle being regulated by a hydraulic pitch change mechanism. The rotor, via appropriate shafts and a gearbox, is coupled to a synchronous generator to produce electrical energy which is fed to a power utility grid. The control system provides closed loop pitch control for rotor acceleration rate during start-up, for rotor deceleration rate during shutdown, for speed control when the synchronous generator is off-line, and for power control when the synchronous generator is on-line. A single control integrator is used for all closed loop operating modes, with a rate limiter circuit in front of the control integrator to prevent integrator overtravel. The integrator has maximum and minimum blade angle stops, the minimum stop being variable as a function of rotor speed and wind speed. When on-line, power control is provided by a unique shaft torque control using proportional plus integral plus derivative controls in combination.

18 Claims, 8 Drawing Figures

MULTI-MODE CONTROL SYSTEM FOR WIND TURBINES

BACKGROUND OF THE INVENTION

1. Field of Invention

This invention relates to a control system for a variable pitch horizontal axis wind energy conversion system which utilizes wind energy to produce electrical power, and specifically to a closed loop control system which automatically modulates the pitch angle of the wind turbine blades to provide safe operation and optimize the energy capture from the wind. The wind turbine rotor drives a synchronous generator which is connected to supply electrical power to a power utility grid, the control system being adapted to rapidly modulate the blade pitch angle to minimize the effects of wind gusts and turbulence to maintain desired electrical frequency and phase, and to reduce stress on the rotor blades and other mechanical components.

2. Description of the Prior Art

The recent energy crisis and the high cost of fossil fuels has resulted in renewed interest in and development of large scale wind turbines, in effect large windmills, which rotate and produce energy in response to natural wind currents. The rotor blades of the wind turbines are up to 300 feet in diameter, and the output power when converted into electrical energy is measured in megawatts. While in some wind turbines the output power is used directly to power mechanical devices, in most installations the rotary energy is converted into electrical power which may be stored, used to power isolated installations directly, or fed to power utility grids for ultimate distribution.

A major problem with wind turbines is that of controlling the electrical output phase and frequency in the presence of unpredictable wind gusts and turbulence, particularly when the wind turbine is driving a synchronous generator connected to a large electrical network. At high wind velocities, even mild wind turbulence conditions can create shaft torque fluctuations of sufficient magnitude to cause the synchronous generator to pull out of phase synchronization and be disconnected from the grid.

In an attempt to overcome this problem, variable pitch angle rotor blades have been provided for use in wind turbines with a rapid acting control system to position the blade angle in response to selected operating parameters such as wind velocity, rotor speed and output power. A representative control system of this type is disclosed and claimed in copending application Ser. Nos. 916,320, 916,321 and 916,329, each filed on June 15, 1978 and assigned to the same assignee as the present application, and to which reference may be made for a complete explanation of such control systems. Briefly, the prior art control systems, referenced supra, control the rotor blade pitch angle in a closed loop manner to maintain constant speed or power depending on whether the generator is off-line or on-line, and in an open loop manner during start-up and shutdown.

The present invention is an improvement of the control system referenced supra, and discloses a wind turbine rotor blade pitch angle control which provides improved dynamic performance and transient response characteristics. The improved operation is obtained by closed loop control of rotor acceleration rate and deceleration rate during start-up and shutdown respectively; by use of a single control integrator for all closed loop operating modes, with a rate limiter in front of the integrator to prevent integrator overtravel, the integrator having maximum and minimum blade angle stops, the minimum stop being variable as a function of rotor speed and wind speed; and by a closed loop shaft torque control for on-line power control, the torque control having proportional, integral and derivative control paths in which rate of change of shaft torque is synthesized from the difference between rotor speed and generator speed.

It is therefore an object of the present invention to provide an improved pitch angle control for a wind turbine which modulates the wind turbine blade angle in response to a number of selected operating conditions.

Another object of this invention is an electronic pitch angle control for wind turbines which schedules blade angle is a closed loop manner to minimize blade stress and shaft torque variations during start-up and shutdown transients.

A further object of this invention is a closed loop electronic pitch angle control for wind turbines which regulates speed when the synchronous generator is off-line and regulates torque when the synchronous generator is on-line.

Another object of this invention is the use of a single control integrator for all closed loop control modes of operation.

A further object of this invention is the use of a rate limiter circuit in front of the control integrator to prevent integrator overtravel.

Another object of this invention is the use of a variable minimum blade angle stop on the electronic control integrator scheduled as a function of rotor speed and wind speed.

A further object of this invention is the use of proportional, integral and derivative compensation for on-line torque control, and proportional plus integral compensation for off-line speed control.

SUMMARY OF THE INVENTION

In accordance with the present invention, a two-bladed horizontal axis, variable pitch wind turbine rotor is connected via a low speed coupling shaft, a step-up gearbox, and a high speed shaft to a synchronous generator which converts the rotational energy to a.c. electric power supplied to a power utility grid. An electronic control establishes a reference blade angle for a closed loop hydraulic pitch change mechanism which varies the pitch of the rotor blades in response thereto. During start-up and shutdown of the wind turbine, a closed loop integral control schedules blade angle to maintain the rotor acceleration and deceleration rates at a safe level. During off-line operation, a closed loop speed control modulates the blade angle to maintain the desired speed. During on-line operation a closed loop shaft torque control modulates the blade angle to maintain the desired level of power being supplied by the synchronous generator. The torque control uses proportional plus derivative plus integral compensation, and the rate of change of shaft torque is synthesized from the difference between rotor speed and generator speed. The speed control uses proportional plus integral compensation.

A unique feature of the present invention is the use of a common electronic integrator for each of the electronic closed loop controls which eliminates the need for integrator tracking circuits in each loop. Another important feature is the use of a rate limiter placed in front of the control integrator with rate limits set to be equal to or slightly less than the slew rate of the pitch change mechanism to prevent integrator overtravel which can lead to instability. The control integrator is provided with maximum and minimum blade angle stops, the minimum blade angle stop being variable and scheduled as a function of velocity ratio, which is equal to rotor speed divided by wind speed.

The control system is specifically adapted for implementation using digital electronics, although analog electronic circuitry may also be used.

DESCRIPTION OF THE PREFERRED EMBODIMENT

Figures 1, 2:
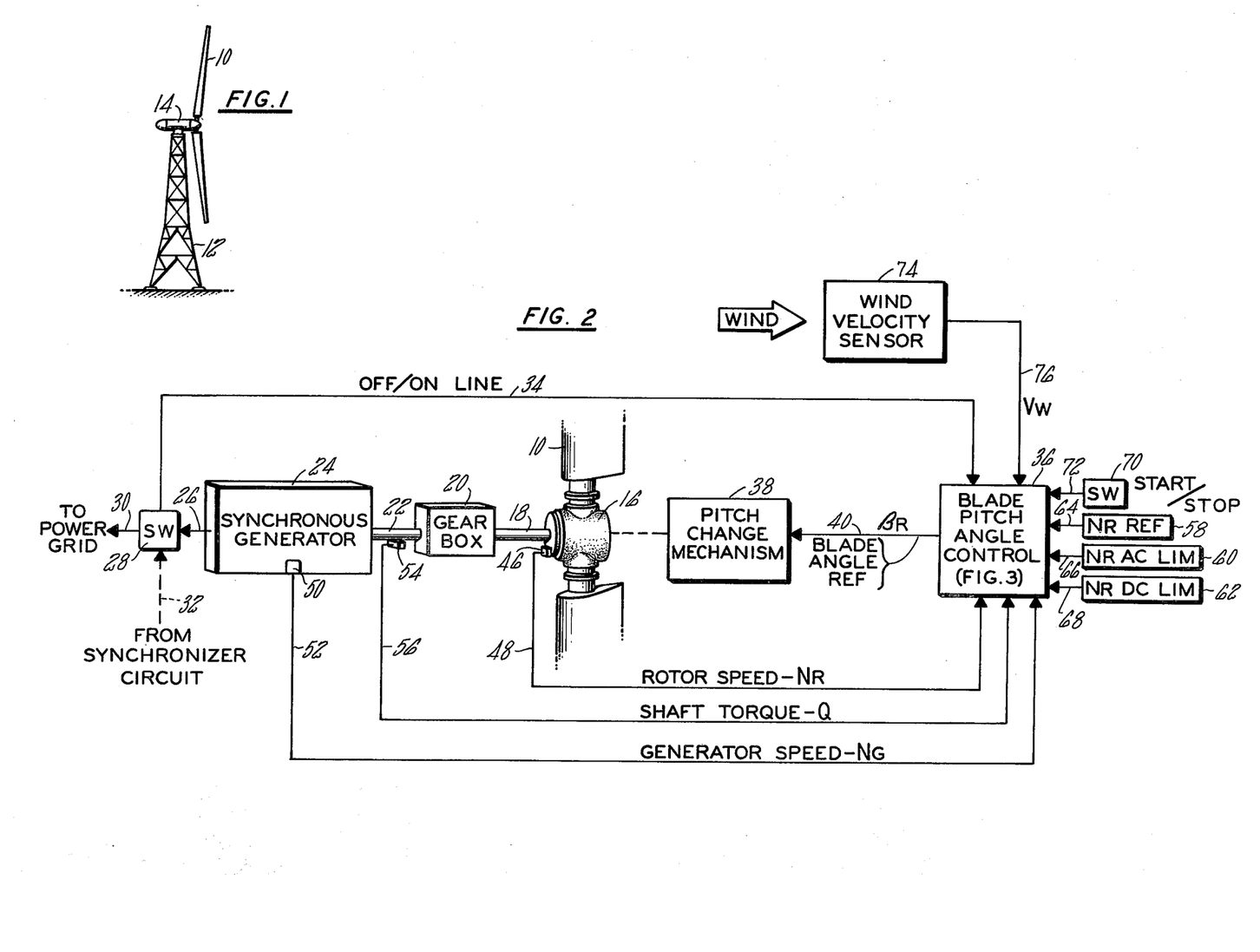
FIG. 1 is a diagram of a representative wind turbine.
FIG. 2 is a schematic diagram of the wind turbine power generating system including the blade pitch angle control.

FIG. 1 shows a representative wind turbine construction consisting of two diametrically opposed identical rotor blades 10, typically totaling 100 to 300 feet in diameter, mounted on a tower 12. The mechanical components, control devices and electrical generating equipment are contained in a nacelle 14. The construction of wind turbines is well known and need not be described in detail. Also, yaw control for orienting the blades into the prevailing wind, although necessary for efficient operation, is well known and will not be described.

In FIG. 2 the turbine rotor blades are shown mounted on a hub 16 connected through a low speed coupling shaft 18, a gearbox 20, and a high speed shaft 22 to a synchronous generator 24. The gearbox 20 steps up the rotary motion of shaft 18 in a ratio dependent upon the number of pairs of poles in the synchronous generator 24 and the desired a.c. output frequency of the synchronous generator. The electrical output from the generator 24 is fed via conductor 26, switch 28 and conductor 30 to the load which may be the power grid of an electrical utility through which the power is fed via transmission lines to remote locations. Switch 28 is closed by a signal appearing on a signal line 32 produced by a conventional phase and frequency synchronizing circuit, when the output from generator 24 is matched to that of the power grid to connect the generator on-line. A signal indicative of the state of switch 28 and thus the on-line/off-line condition of the system is fed via signal line 34 to a blade pitch angle control 36. The signal on line 34 may be digital, or an analog voltage or current level, and will be denoted 0 when the generator is off-line and 1 when the generator is on-line.

The blade pitch angle control 36 is the heart of the wind turbine control system, and will be described in detail in subsequent Figures. Briefly, control 36 receives input signals indicative of desired wind turbine operating levels, and signals from sensors which measure actual wind turbine operating parameters, and using closed loop electronic controls modulates the pitch angle of the blades via an electro-hydraulic closed loop pitch change mechanism 38. Control 36 produces a desired or reference blade angle signal $B_R$ which is fed to pitch change mechanism 38 via line 40. The electro-hydraulic pitch change mechanism converts the electrical blade angle reference signal $B_R$ to the actual blade angle denoted $B_P$.

In order to provide the necessary operating data to control 36, feedback sensors are located at selected locations in the wind turbine. A transducer 46 is connected to hub 16 and provides a signal on a line 48 indicative of rotor speed, $N_R$. A similar transducer 50 is connected to a shaft in synchronous generator 24 to provide a signal on a line 52 indicative of generator speed, $N_G$. A transducer 54 such as conventional strain gages is connected to shaft 22, or alternately to shaft 18 or a shaft in gearbox 20, to provide a signal on a line 56 indicative of shaft torque $Q_S$. While not shown, generator electrical power or generator current may be sensed in an analogous manner in place of shaft torque. Each of the signals on lines 48, 52 and 56 is fed as an input to control 36.

Also fed to control 36 are a plurality of fixed or variable reference signals, either voltage levels in analog format or digital words in digital format. The reference signal sources are a rotor speed reference source, $N_R$ REF, shown in block 58, and rotor acceleration and deceleration rate limits $\dot{N}_R$ AC LIM and $\dot{N}_R$ DC LIM respectively shown in blocks 60 and 62, the reference signals being fed to control 36 via signal lines 64, 66 and 68. A start/stop switch 70 feeds a signal to control 36 via a signal line 72, the signal being a 1 to start the wind turbine, and a 0 to stop the turbine. The $N_R$ REF signal may be supplied from another portion of the system, not shown.

Wind velocity $V_W$ is sensed by a wind velocity sensor 74 and a signal indicative thereof supplied to control 36 via a signal line 76. The dynamic characteristics of the wind velocity sensor 74 are such that the wind velocity signal on line 76 represents the average rather than the instantaneous wind velocity.

While not shown in the drawings, other functions may be performed by the wind turbine control system such as the sensing and displaying of essential parameters including line voltage, hydraulic pressure, oil level, oil temperature, bearing temperature, vibration and generator voltage. Emergency shutdown devices responsive to malfunctions may also be provided as part of the system. A control using digital electronics is more readily adapted to these additional functions, and may easily be programmed to accept and execute manual commands.

The control 36 for the wind turbine provides four distinct modes of operation. The first control mode is start-up, and occurs when the average wind velocity reaches a value where the wind turbine and generator can provide useful power. The blades must be moved from their feathered (90°) position toward low pitch so that the blades can provide torque to accelerate the rotor and generator to rated speed conditions, without at the same time stalling the blade or producing large accelerating stresses.

The second control mode is off-line speed control. As the speed of the generator increases to the value required to provide the desired electrical output frequency, a speed control is utilized to maintain the desired speed by modulating the blade angle. The speed control may also be used to adjust the phase relationship between the synchronous generator and the power grid so that the synchronous generator can be connected to the network. The $N_R$ REF signal may be varied for this purpose. A specific example of a speed control used for phase adjustment is described in copending application Ser. No. 916,221. In theory it is possible to control either generator or rotor speed, but the control is easier to implement if rotor speed is regulated.

The third control mode is on-line power control. Once the generator has reached a speed which produces the desired frequency, and the generator phase is adjusted to match that of the power grid, the generator is connected to the network. The pitch angle of the rotor blades is now modulated to maintain the desired level of power being supplied by the generator. At high wind velocities the rotor is capable of developing many times rated power. Turbulent wind fluctuations in a high average velocity region present significant disturbances, and rapid pitch modulation is required to minimize power fluctuations during these turbulent wind conditions. Power control is provided by measuring shaft torque. Since speed is essentially constant during on-line operation, shaft torque is a direct measure of power. Other parameters which may be used to control power are generator current or electrical power.

The fourth control mode is shutdown. If the system is to be shutdown for any reason, the blade angle must be increased toward its 90° feathered position. Large decelerating torques are developed if the blade angle is increased too rapidly.

Figure 3:
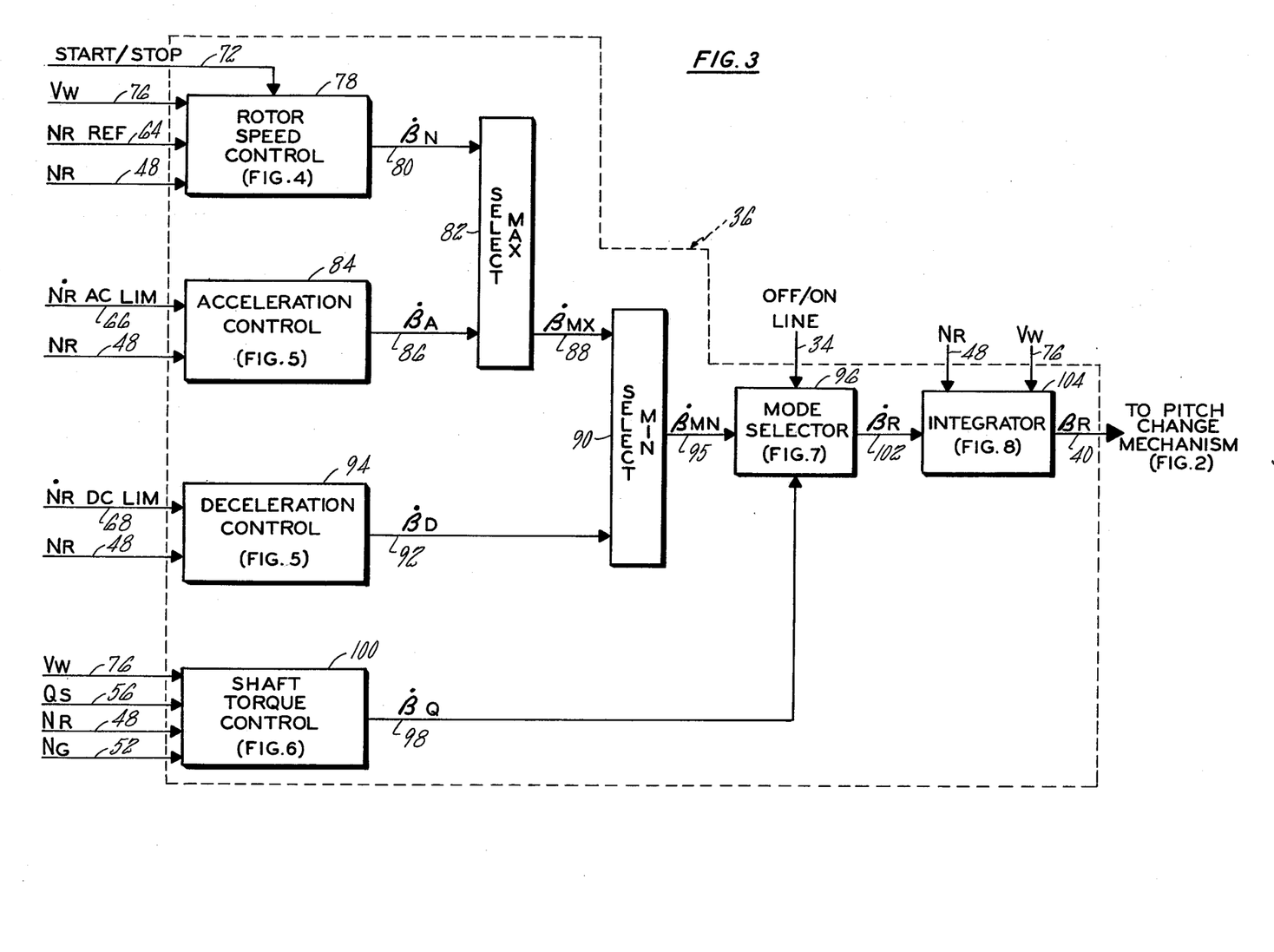
FIG. 3 is a schematic diagram showing the details of the blade pitch angle control of FIG. 2.

The blade pitch angle control 36 of FIG. 2 is shown in block diagram form in FIG. 3. The rotor speed control shown as block 78 receives as inputs the average wind velocity signal $V_W$ on line 76, the rotor speed reference signal $N_R$ REF on line 64, and the rotor speed signal $N_R$ on line 48, as well as the start/stop signal on line 72. The rotor speed control, described in detail in FIG. 4, produces a rotor speed blade angle rate signal $\dot{B}_N$ which is fed via a signal line 80 to a maximum selector circuit 82.

The acceleration control shown as block 84 receives as inputs the rotor acceleration limit signal $N_R$ AC LIM on line 66, and the rotor speed signal $N_R$ on line 48, and produces an acceleration blade angle rate signal $\dot{B}_A$ which is fed via a signal line 86 to the maximum selector circuit 82. The acceleration control 84 is described in detail in FIG. 5.

The maximum selector circuit 82 selects the blade angle rate signal on lines 80 or 86 which will produce the slowest rate of decrease of blade angle, or highest rate of increase of blade angle, that is, the blade angle rate which will maintain the blade pitch angle at its maximum with respect to feather, 90°. The selected blade angle rate signal is fed via a signal line 88 to a minimum selector circuit 90. The selected blade angle signal on line 88 is denoted $\dot{B}_{MX}$.

Also fed as an input to minimum selector circuit 90 is the deceleration blade angle rate signal $\dot{B}_D$ on signal line 92 which is produced by the deceleration control shown as block 94. The deceleration control 94 receives as input signals thereto the rotor deceleration limit signal $N_R$ DC LIM on line 68, and the rotor speed signal $N_R$ on line 48. The deceleration control 94 is described in greater detail in FIG. 5.

The minimum selector circuit 90 selects the blade angle rate signal on line 88 or 92 which calls for the fastest rate of decrease of blade angle. The output from the minimum select circuit 90 is the minimum rate signal $\dot{B}_{MN}$ appearing on signal line 95 and is fed as an input to a mode selector circuit 96.

Also fed as an input to the mode selector circuit 96 is the shaft torque blade angle rate signal $\dot{B}_Q$ on signal line 98. The signal is produced by a shaft torque control shown as block 100 which receives as input signals thereto the average wind velocity signal $V_W$ on line 76, the shaft torque signal $Q_S$ on line 56, the rotor speed signal $N_R$ on line 48, and the generator speed signal $N_G$ on line 52. The shaft torque control 100 is described in greater detail in FIG. 6.

Also fed as an input to mode selector 96 is the off/on line signal on line 34 which indicates whether the synchronous generator 24 of FIG. 2 is connected to the power grid via switch 28. The mode selector 96, described in greater detail in FIG. 7, selects the minimum blade angle rate signal on line 95 when the synchronous generator is off-line, and the torque blade angle rate signal on line 98 when the synchronous generator is on-line. The selected signal is denoted as the blade angle reference rate signal, $\dot{B}_R$, and is passed via signal line 102 to an electronic integrator 104. The integrator also receives as inputs thereto the rotor speed signal $N_R$ on line 48, and the average wind velocity signal $V_W$ on line 76. The integrator circuit 104, described in greater detail in FIG. 8, integrates the output from the mode select circuit 96 and produces as an output signal on line 40 the blade angle reference signal $B_R$, also shown in FIG. 2.

With reference to FIG. 3, then the start-up command is given a digital 1 appears on signal line 72 and the speed reference signal $N_R$ REF in rotor speed control 78 is stepped from zero to its nominal value. The speed control 78 then commands a large negative blade angle rate $\dot{B}_N$ on line 80. The acceleration control 84 at this time also commands a negative blade angle rate $\dot{B}_A$ which is algebraically larger. The maximum selector 82 selects $\dot{B}_A$, that is, the blade angle rate calling for the slowest rate of decrease of blade angle. The deceleration control 94, during start-up, commands a positive blade angle rate and the minimum select circuit 90 also selects $\dot{B}_A$, the acceleration blade angle rate. Since the system is operating off-line, the mode selector 96 passes $\dot{B}_A$ to the integrator 104.

As the rotor speed increases, the value of $\dot{B}_N$ on signal line 80 increases (becomes less negative) until it eventually exceeds the value of $\dot{B}_A$. At this point, the maximum select circuit 82 selects $\dot{B}_N$. Since the value of $\dot{B}_N$ is still lower than $\dot{B}_D$ on line 92, the minimum selector circuit 90 passes the value of $\dot{B}_N$ through the mode select circuit 96 to the integrator 104. The system is now operating on rotor speed control, and in a steady state constant wind velocity condition, $\dot{B}_N$ would approach zero, $\dot{B}_A$ would be at some negative value and $\dot{B}_D$ at some positive value.

If now a command is given to stop the wind turbine, the reference speed in the rotor speed control is stepped from its nominal value to zero by virtue of the stop signal, a digital zero, on signal line 72. The rotor speed control 78 now commands a very large positive blade angle rate, much larger than the rate commanded by the acceleration control 84. The maximum selector circuit 82 now selects $\dot{B}_N$. However, this value is also much larger than the rate commanded by the deceleration control, $\dot{B}_D$. The minimum selector circuit 90 therefore selects $\dot{B}_D$ and passes this signal through the mode select circuit 96 to the integrator 104. The wind turbine now stops under the control of the deceleration control 94.

For on-line operation, the mode selector 96 passes the blade angle rate $\dot{B}_Q$ commanded by the shaft torque control 100 to the control integrator 104 by virtue of the signal on signal line 34.

The dynamic characteristics of the four control circuits shown in FIG. 3 as well as the mode selector 96 and rate limited integrator 104 will be described with respect to subsequent figures.

Figure 4:
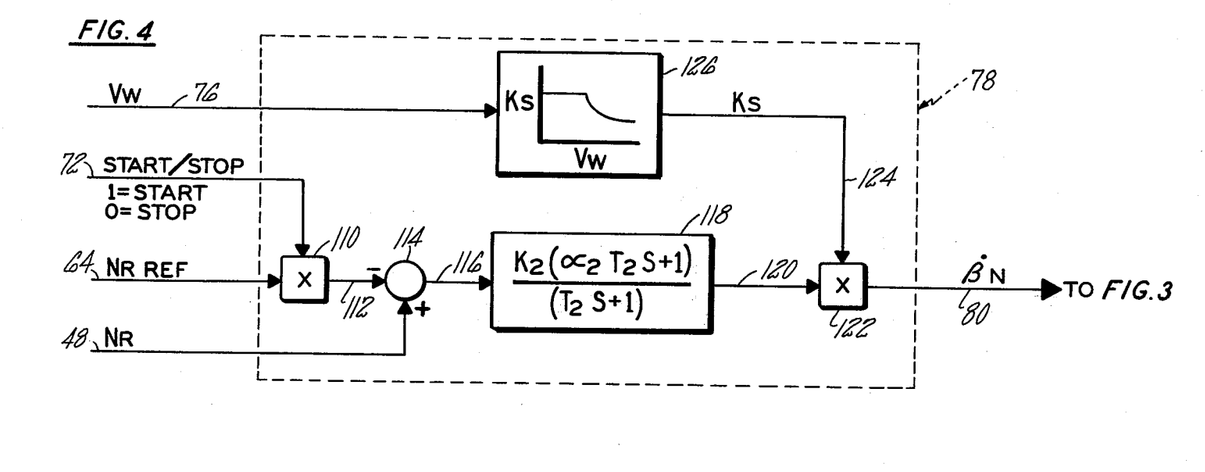
FIG. 4 is a schematic diagram of the rotor speed control of FIG. 3.

FIG. 4 shows the details of the rotor speed control 78 of FIG. 3. The start/stop signal on line 72 is fed to a multiplier 110 together with the speed reference signal $N_R$ REF on line 64.

The start/stop signal is a multiplier for the speed reference signal, a digital 1 appearing on line 72 when it is desired to start the wind turbine, and a digital 0 when it is desired to stop the wind turbine. Assuming that a digital 1 appears on line 72, multiplier 110 passes therethrough the $N_R$ REF signal on line 64 via output line 112 which is fed as one input to junction 114. Also fed as an input to junction 114 is the rotor signal, $N_R$, on line 48. The rotor reference speed on line 112 is compared with the actual rotor speed on line 48 at junction 114, and any speed error appears on signal line 116. The speed error on line 116 is then passed through the compensating circuit 118 and fed via signal line 120 to a multiplier 122. The compensating circuit 118 contains a lead-lag network shown in analog form. The gain $K_2$ is constant and represents a manually adjustable control gain.

Also fed to the multiplier 122 is a variable gain on signal line 124 scheduled as a function of average wind speed. The wind speed signal $V_W$ on line 76 is fed to a function generator 126 which schedules the variable gain, $K_S$, as a function of wind speed. The use of a variable gain is desirable to compensate for the non-linear rotor aerodynamic characteristic in which rotor torque changes with blade angle. The variable gain on line 124 produced in function generator 126 is used to multiply the speed control signal on line 120 in multiplier 122. The output of multiplier 122 is the rotor speed blade angle rate signal $\dot{B}_N$ on signal line 80.

Wind turbine speed control can be achieved either by directly controlling generator speed of rotor speed. The preferred choice is rotor speed control since in order to achieve a responsive control using generator speed, the control must provide a compensating network not only to compensate for a long rotor lag, but also to provide quadratic lead compensation to compensate for the resonance created by the shaft stiffness interconnecting the rotor and generator inertias. For wind turbine applications, This quadratic lead compensation is automatically provided by sensing rotor speed rather than generator speed. Sensing rotor speed for speed control requires only lead compensation for the rotor lag to achieve a responsive speed control.

Figure 5:
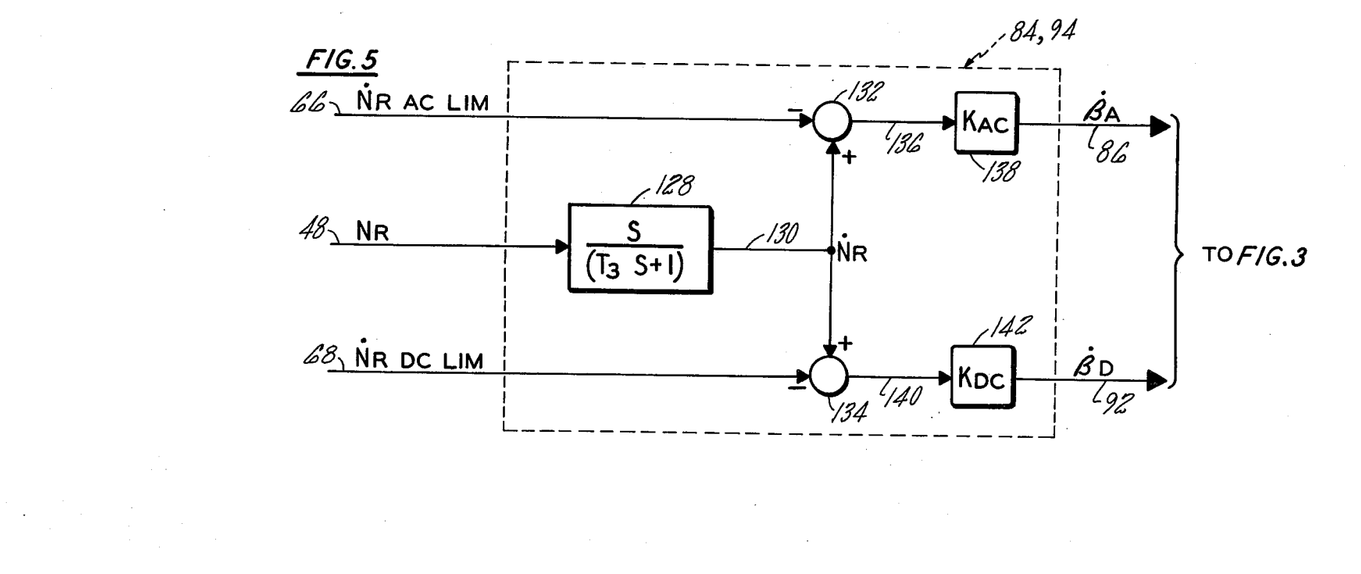
FIG. 5 is a schematic diagram of the acceleration and deceleration controls of FIG. 3.

FIG. 5 shows the details of the combined acceleration and deceleration controls 84 and 94 of FIG. 3. The rotor speed signal $N_R$ on line 48 is fed to a derivative network 128 with a transfer function as shown in the block. The output from the derivative network 128 is proportional to the rate of change of rotor speed, $\dot{N}_R$, and appears on signal line 130. The signal on line 130 is compared in junction 132 with the rotor speed acceleration limit signal $\dot{N}_R$ AC LIM on line 66. Any difference therebetween, a speed acceleration error signal, is fed via signal line 136 to an acceleration control gain 138 to produce the acceleration blade angle rate signal $\dot{B}_A$ on signal line 86. The rotor speed rate signal $\dot{N}_R$ on signal line 130 is also compared at junction 134 with the rotor speed deceleration limit signal $\dot{N}_R$ DC LIM on signal line 68, any difference therebetween being fed via signal line 140 through gain 142 to produce the deceleration blade angle rate signal $\dot{B}_D$ on signal line 92. During acceleration and deceleration the blade angle is modulated to maintain a constant rotor acceleration or deceleration rate. Acceleration and deceleration $\dot{N}_R$ limits are established by computing the acceleration resulting from an accelerating torque of approximately 100% of rated torque. The acceleration and deceleration controls in effect limit the value of rotor torque to a value of +100% for start-up and −100% during shutdown, thereby minimizing blade stresses during these modes of operation. Because there is no long lag in the transfer function from aerodynamic torque change to rotor acceleration, a simple integral control is satisfactory, the time constant $T_3$ in derivative network 128 being used for noise filtering.

Figure 6:
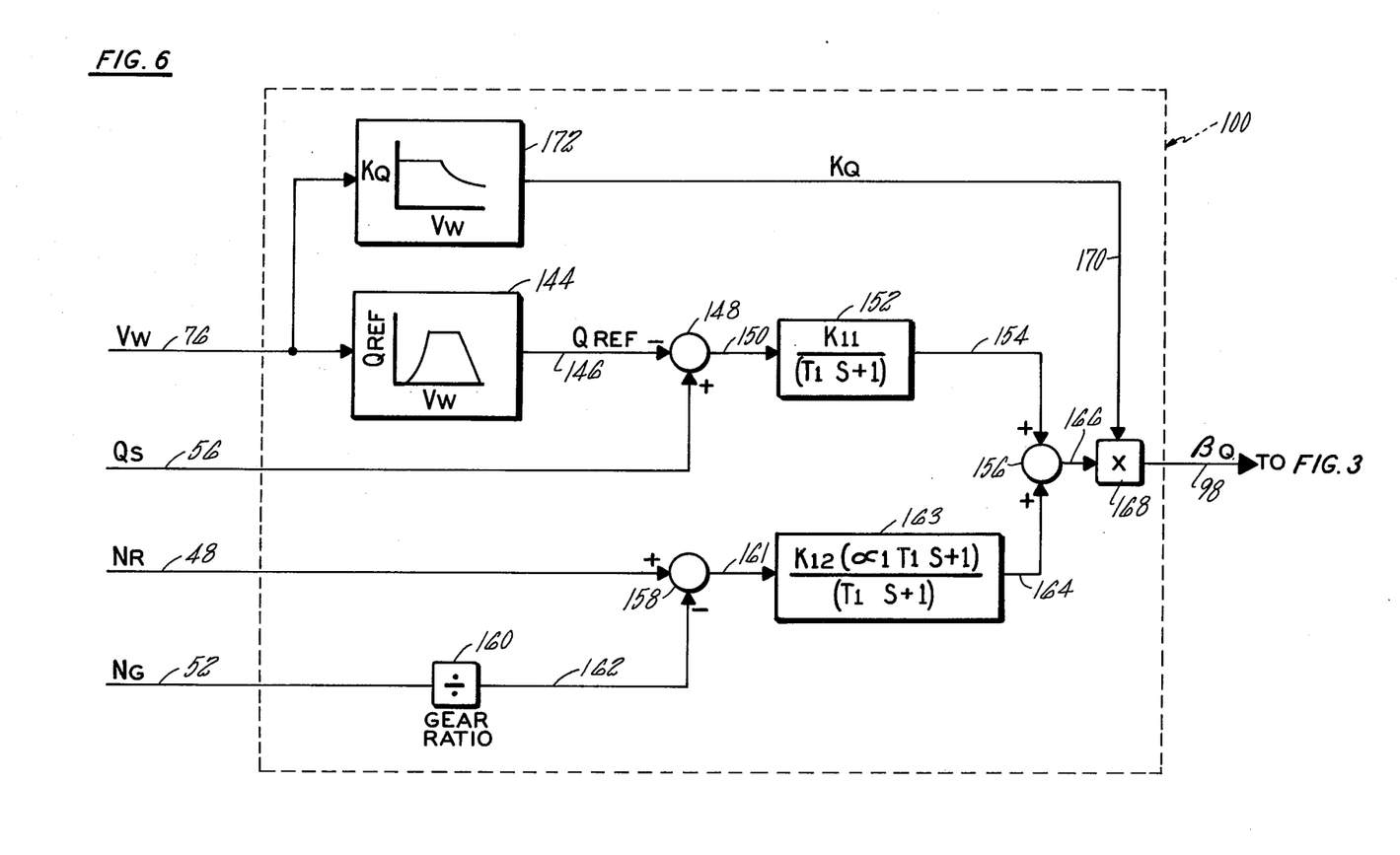
FIG. 6 is a schematic diagram of the shaft torque control of FIG. 3.

FIG. 6 shows the details of the on-line shaft torque control 100 of FIG. 3. A torque reference signal QREF is scheduled in function generator 144 as a function of the average wind velocity signal, $V_W$ appearing on line 76, the torque reference signal appearing on signal line 146 and being fed as one input to summing junction 148. The torque reference signal is compared in the summing junction 148 with the actual torque signal, $Q_S$, appearing on signal line 56. The output from the summing junction, a signal indicative of torque error, appears on signal line 150 and is passed through the dynamic compensation circuit 152 which provides a gain and a lag to the torque error signal. The compensated torque error signal is then fed via a signal line 154 as one input to a summing junction 156.

The derivative of shaft torque is given approximately by the equation ($N_R - N_G$ Generator Ratio), i.e., the torsional spring rate between the rotor and the generator. This equation is implemented in FIG. 6. The rotor speed, $N_R$, on line 48 is fed as one input to summing junction 158. The generator speed signal, $N_G$, on signal line 52 is fed to a divider circuit 160 where the generator speed is divided by a number equivalent to the gear ratio between the rotor and the generator. The signal appearing on line 162 is therefore equivalent to the rotor speed if there is no torque. The signal on line 162 is fed as the other input to summing junction 158. The two signals are compared in summing junction 158 and produce on-signal line 161 a signal indicative of the difference between rotor speed and generator speed which is proportional to the derivative of shaft torque. This signal is then fed through the dynamic compensation network 163 and via signal line 164 to summing junction 156 where the compensated shaft torque derivative signal is added to the lagged torque error signal on line 154. The lead compensation in block 163 makes its output a function of speed error and rate of change of speed error through the lag $T_1$. Since speed error is proportional to the derivative of shaft torque $\dot{Q}_S$, then the output from block 163 is related to the first and second derivatives of shaft torque $\dot{Q}_S$ and $\ddot{Q}_S$, through a tag $T_1$.

When the output from block 163 is summed with shaft torque error through the lag in block 152 via lines 164 and 154 in summing junction 156, the output becomes a function of $Q_S$, $\dot{Q}_S$, and $\ddot{Q}_S$. When integrated in integrator 104 (FIG. 3), this control provides proportional, integral and derivative control gains to the shaft torque signal.

The output from the summing junction 156 is fed via signal line 166 to multiplier 168 where it is multiplied by a variable gain signal, $K_Q$, appearing on signal line 170. The variable gain is provided in function generator block 172 as a function of average wind velocity, $V_W$, on line 76. The output from the multiplier 168 is the shaft torque blade angle rate signal $\dot{B}_Q$ on line 98. The use of a variable gain and multiplier 168 is desirable to compensate for the non-linear rotor aerodynamic characteristics. The control mode described in FIG. 6 in effect provides quadratic lead compensation which compensates for the on-line torsional resonance which is present in the power control loop. This resonance is determined primarily by the rotor inertia and the equivalent torsional spring rate between the rotor and power grid. The derivative gain provides improved damping on this resonance.

When the generator is connected to a large power grid network, generator speed is so nearly constant that the generator speed signal $N_G$ on line 52 can be replaced by the fixed synchronous value of generator speed with no significant effect on system performance.

Figure 7:
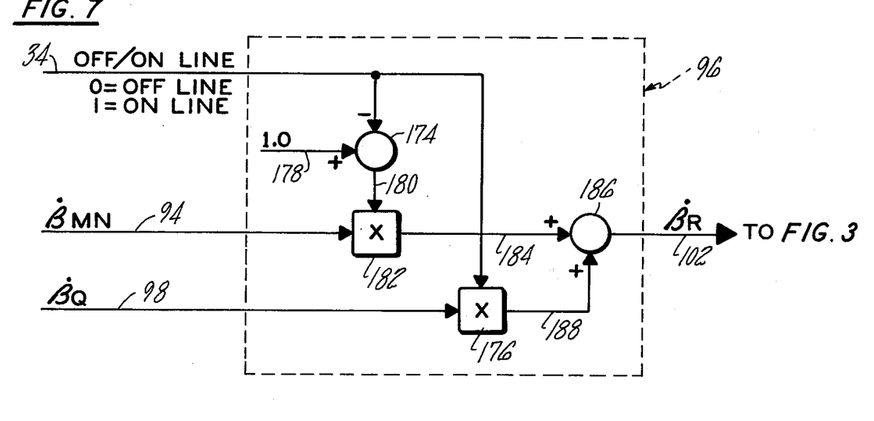
FIG. 7 is a schematic diagram of the mode selector of FIG. 3.

FIG. 7 shows the preferred implementation of the mode selector circuit 96 of FIG. 3. The off/on line signal on line 34 is fed to a summing junction 174 and a multiplier 176. The off/on line signal is produced in switch 28 of FIG. 2, and is 0 when the synchronous generator is off line, and 1 when the synchronous generator is connected to the power grid on line. Also fed to summing junction 174 is a 1 on signal line 178. The output from the summing junction 174 is fed via signal line 180 to a multiplier 182. The minimum blade angle rate signal $\dot{B}_{MN}$ is also fed to multiplier 182 via line 94. The output from the multiplier 182 is fed via line 184 as one input to summing junction 186. Also fed as an input to multiplier 176 is the torque blade angle rate signal, $\dot{B}_Q$, on signal line 98. The output from multiplier 176 is fed via signal line 188 as the second input to summing junction 186. The output from the summing junction 186 appears as reference blade angle rate signal, $\dot{B}_R$, on line 102.

If the control system is operating such that the synchronous generator is off line, 0 appears on signal line 34 and is compared with the 1 in summing junction 174. The output from the summing junction will be a 1 on signal line 180, and the minimum blade angle signal $\dot{B}_{MN}$ on line 94 is therefore multiplied by 1. Therefore the output from the multiplier 182 on line 184 is exactly equal to the minimum blade angle rate signal on line 94. At the same time the 0 on line 34 is fed to the multiplier 176 and the signal appearing on line 188 will be 0. Therefore, the output signal on line 102 will be exactly equal to the signal on line 94.

If the synchronous generator is connected on line, the 1 appearing on line 34 will be canceled by the 1 on line 178 in summing junction 174, and the signal applied to multiplier 182 via line 180 will be 0, resulting in a 0 appearing on signal line 184. At the same time, the 1 on line 34 will cause the signal on line 188 to be exactly the same as that on line 98, and the output signal on line 102 will be equal to the torque blade angle rate signal $\dot{B}_Q$ on line 98.

Figure 8:
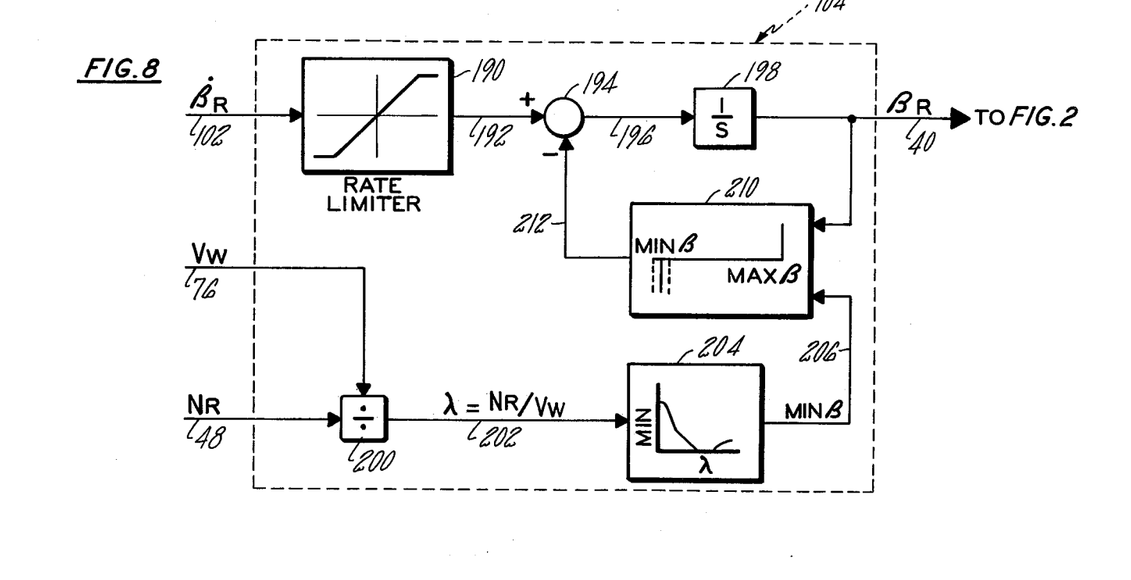
FIG. 8 is a schematic diagram of the integrator of FIG. 3.

A single common integrator 104 as shown in FIG. 3 is used for all modes of control. FIG. 8 shows in block diagram form a preferred implementation of a rate limited integrator with maximum and minimum position stops. Referring to FIG. 8, the reference blade angle rate signal $\dot{B}_R$ on signal line 102 is fed to a rate limiter circuit 190 and then via signal line 192 to a junction 194. The output from junction 194 is fed via signal line 196 to an integrator 198. Integration of the rate signal $\dot{B}_R$ provides a blade angle reference signal denoted $B_R$ on signal line 40. The rate limits in rate limiter circuit 190 are set to a value equal to or less than the slew rate capabilities of the hydraulic pitch change loop. Thus if the blade angle reference rate signal $\dot{B}_R$ is greater than the slew rate capability of the pitch change mechanism, the control rate limiter 190 will limit the output of the rate limiter to a value never larger than the slew rate capabilities of the pitch change mechanism. The rate limiting is important because it prevents the control integrator 198 from overtraveling. Without the rate limiter, a large wind disturbance which could result in $\dot{B}_R$ exceeding the slew rate capability of the pitch change mechanism would cause the control integrator to overtravel, that is, the error between the reference blade angle $B_R$ and the actual blade angle would become large. In such cases a severe limit cycle instability could result. The rate limiter prevents this instability from occurring.

The control integrator 198 has maximum and minimum position stops. In a digital electronic control system these stops would be implemented by digital words. The maximum stop corresponds to the feathered or 90° position, and the minimum stop of the control integrator is a variable which is scheduled as a function of $\lambda$, where $\lambda$ is the ratio of rotor speed to wind speed. Referring again to FIG. 8, $\lambda$ is computed in a divider circuit 200 which divides the rotor speed signal $N_R$ on line 48 by the average wind velocity signal $V_W$ on line 76. The output from the divider circuit 200 is the velocity ratio $\lambda$ that appears on signal line 202. A function generator 204 receives the velocity ratio $\lambda$ on line 202 and schedules as a function thereof a minimum blade angle signal, MIN B, on signal line 206. The minimum blade angle schedule shown in function generator 204 is obtained by establishing a blade angle corresponding to maximum rotor torque.

The minimum blade angle signal on line 206 is fed to a circuit 210. Also fed as an input to circuit 210 is the blade angle reference signal $B_R$ on signal line 40. Circuit 210, which implements the maximum and minimum integrator stops, produces a high gain output signal on signal line 212 whenever the blade angle reference $B_R$ is greater than 90° or less than a minimum blade angle. The output of circuit 210 is zero when the blade angle is between the minimum and maximum limits. The high gain feedback signal on signal line 212 is compared with the signal on line 192 in summing junction 194 to produce the input to the integrator 198 which prevents the integrator output on line 40 from exceeding the limits.

As noted in FIG. 8, the minimum blade angle in circuit block 210 is variable as a function of the minimum blade angle scheduled via line 206. The minimum blade angle schedule is encountered only during start-up in low wind speeds. When starting up in high wind speeds, there is more than enough power in the wind to accelerate the rotor at the rate desired by the acceleration control 84 of FIG. 3. This acceleration rate is approximately 6.5% speed/second. Under these conditions, the acceleration control governs the start-up operation and the minimum blade angle limit is not encountered. When starting in very low wind speeds, there is not sufficient power in the wind to accelerate the rotor at the rate desired. Under these conditions, the minimum blade angle limit is encountered and a maximum but less than 100% accelerating torque is developed. The combination of the closed loop acceleration control and the variable minimum blade angle stop in the electronic integrator prevent stalling of the rotor during start-up and insures that the rotor will accelerate at the maximum rate possible but never faster than the rate corresponding to an accelerating torque of 100% under all wind conditions.

While the wind turbine system has been described in a preferred embodiment thereof, it is apparent that modifications may be made thereto without departing from the scope of the invention as hereinafter claimed.

We claim:

1. In a power generating system including a wind turbine driven generator adapted to be selectively connected to a load to supply power thereto, said wind turbine having a wind driven rotor with a plurality of variable pitch angle blades, a control for adjusting the pitch angle of said blades comprising:

speed control means adapted to produce a first signal indicative of rate of change of blade pitch angle when said generator is not supplying power to said load, acceleration control means adapted to produce a second signal indicative of rate of change of blade pitch angle during start up of said wind turbine, deceleration control means adapted to produce a third signal indicative of rate of change of blade pitch angle during shut down of said wind turbine, power control means adapted to produce a fourth signal indicative of rate of change of blade pitch angle when said generator is supplying power to said load, means for selecting one of said blade pitch angle rate signals, integrator means receiving said selected blade pitch angle rate signal and producing therefrom a desired blade pitch angle signal, and actuator means receiving said desired blade pitch angle signal and controlling the pitch angle of said blades in response thereto.

2. A power generating system as in claim 1 in which said acceleration control means comprises:

means for sensing the speed of said rotor and producing a signal indicative thereof, means for producing from said rotor speed signal a rate signal indicative of rate of change of rotor speed, means for producing a reference signal indicative of rotor acceleration limit, and comparator means for comparing said rotor speed rate signal with said rotor acceleration limit reference signal to produce therefrom said second signal.

3. A power generating system as in claim 1 in which said deceleration control means comprises:

means for sensing the speed of said rotor and producing a signal indicative thereof, means for producing from said rotor speed signal a rate signal indicative of rate of change of rotor speed, means for producing a reference signal indicative of rotor deceleration limit, and comparator means for comparing said rotor speed rate signal with said rotor deceleration limit reference signal to produce therefrom said third signal.

4. A power generating system as in claim 1 in which said speed control means comprises:

means for sensing the speed of said rotor and producing a signal indicative thereof, means for producing a reference signal indicative of desired rotor speed, comparator means for comparing said rotor speed signal with said reference rotor speed signal and producing therefrom a rotor speed error signal, means for producing from said rotor speed error signal a signal indicative of the rate of change of rotor speed error, means for sensing average wind velocity and producing a signal indicative thereof, means responsive to said wind velocity signal for producing a gain signal as a function thereof, and multiplier means for multiplying said rate of change of rotor speed error signal by said gain signal to produce said first signal.

5. A power generator system as in claim 4 in which said means for producing a signal indicative of the rate of change of rotor speed error comprises signal compensation means providing proportional and integral compensation.

6. A power generating system as in claim 4 and further including switch means adapted to produce a first signal for initiating operation of said wind turbine and a second signal for stopping operation of said wind turbine, and means connected with said switch means and with said means for producing said reference rotor speed signal for passing said reference rotor speed signal to said comparator means when said switch means produces said first signal, and for passing a reference rotor speed signal of zero to said comparator means when said switch means produces said second signal.

7. A power generating system as in claim 1 in which said rotor is connected to drive said generator via a shaft means, and in which said power control means comprises:

means for sensing the speed of said rotor and producing a rotor speed signal indicative thereof, means for sensing the speed of said generator and producing a generating speed signal indicative thereof, means for comparing said rotor speed signal with said generator speed signal and producing a speed error signal proportional to the difference therebetween, compensating means including integral, derivative and proportional compensation for producing from said speed error signal a speed error rate signal, means connected with said shaft means for sensing the torque of said shaft means and producing a shaft torque signal indicative thereof, means for sensing the average velocity of the wind driving the rotor and producing a wind velocity signal indicative thereof, first means responsive to said wind velocity signal for producing as a function thereof a shaft torque reference signal, means for comparing said shaft torque signal with said shaft torque reference signal and producing a shaft torque error signal proportional to the difference therebetween, means for summing said shaft torque error signal with said speed error rate signal, second means responsive to said wind velocity signal for producing as a function thereof a gain signal, and means for multiplying said summed shaft torque error signal and speed error rate signal by said gain signal to produce said fourth signal.

8. A power generating system as in claim 1 in which said means for selecting one of said blade pitch angle rate signals comprises:

a maximum selector means receiving said first and second signals and passing therethrough the signal adapted to maintain the blade pitch angle at its maximum relative to feather, a minimum selector means receiving the signal passed by said maximum selector means and also receiving said third signal, said minimum selector means passing therethrough the signal adapted to maintain the blade pitch angle at its minimum relative to feather, a mode selector means receiving the signal passed by said minimum selector means and also receiving said fourth signal, means for sensing the connection of said generator to said load and producing a discrete signal indicative thereof, means for feeding said discrete signal to said mode selector means, said mode selector means passing therethrough said fourth signal when said discrete signal is present and passing therethrough the signal received from said minimum selector means when said discrete signal is not present, and means connecting the signal passed by said mode selector means to said integrator means.

9. A power generating system as in claim 1 in which said integrator means comprises:

rate limiter means receiving said selected blade pitch angle rate signal for limiting the magnitude of said blade pitch angle rate signal within a preselected range, and an electronic integrator receiving the blade pitch angle rate signal from said rate limiter means and producing therefrom said desired blade pitch angle signal.

10. A power generating system as in claim 9 and further including blade angle limiter means having maximum and minimum blade angle limits and responsive to the magnitude of the desired blade pitch angle signal produced in said electronic integrator for maintaining said desired blade pitch angle signal within said maximum and minimum blade angle limits.

11. A power generating system as in claim 10 and further including:

means for sensing the average velocity of the wind driving said rotor and producing a wind velocity signal indicative thereof, means for sensing the speed of said rotor and producing a rotor speed signal indicative, means for dividing said rotor speed signal by said wind velocity signal to produce a velocity ratio signal, means responsive to said velocity ratio signal for producing a minimum blade angle signal variable as a function thereof, and means for varying the minimum blade angle limit in said blade angle limiter means in response to said minimum blade angle signal.

12. In a control system for a wind turbine, said wind turbine having a wind driven rotor with variable pitch angle blades, the improvement comprising:

closed loop control means responsive to system operating conditions for producing a control signal indicative of desired rate of change of blade pitch angle, rate limiter means receiving said control signal for maintaining said control signal within predetermined limits, electronic integrator means for producing from said control signal a signal indicative of desired blade pitch angle, said integrator means including pitch angle limiter means for maintaining said desired blade pitch angle signal within predetermined maximum and minimum limits, and blade pitch change means responsive to said desired blade pitch angle signal for varying the blade pitch angle.

13. A control system as in claim 12 and including means responsive to wind velocity and rotor speed for varying the minimum limit in said pitch angle limiter means.

14. A control system as in claim 12 in which said closed loop control means comprises means responsive to the difference between actual rate of increase of rotor speed during start up of said wind turbine and a limiting rate of increase of rotor speed during start up for producing said control signal.

15. A control system as in claim 12 in which said closed loop control means comprises means responsive to the difference between actual rate of decrease of rotor speed during shut down of said wind turbine and a limiting rate of decrease of rotor speed during shut down for producing said control signal.

16. In a wind turbine having a wind driven rotor with a plurality of variable pitch angle blades, means for maintaining a substantially constant rate of change of rotor speed during start up and shut down of said wind turbine comprising:

means for sensing the actual speed of said rotor and producing a rotor speed signal indicative thereof, rate sensor means for producing from said rotor speed signal a signal indicative of the actual rate of change of rotor speed, means producing a reference signal proportional to a rotor speed rate of change limit, comparator means comprising said actual rate of change of rotor speed signal with said reference signal and producing an error signal proportional to the difference therebetween, and means responsive to said error signal for varying the pitch angle of said rotor blades.

17. In a wind turbine having a wind driven rotor with a plurality of variable pitch angle blades, said rotor being adapted to be connected to a generator via a shaft means, means for controlling the power output from said generator comprising:

means for sensing the actual speed of said rotor and producing a rotor speed signal indicative thereof, means for sensing the actual speed of said generator and producing a generator speed signal indicative thereof, means for comparing said rotor speed signal with said generator speed signal and producing a speed error signal variable with the difference therebetween, signal compensating means responsive to said speed error signal for producing therefrom a signal proportional to the rate of change of speed error, means for measuring the torque of said shaft means and producing a shaft torque signal indicative thereof, means for producing a reference signal proportional to a desired shaft torque, means for comparing said shaft torque signal with said reference signal and producing a shaft torque error signal variable with the difference therebetween, means for summing said rate of change of speed error signal with said shaft torque error signal to produce a rate of change of shaft torque signal, and means responsive to said rate of change of shaft torque signal for varying the pitch angle of said rotor blades.

18. A wind turbine control as in claim 17 and including means responsive to the velocity of the wind driving said rotor for producing said reference signal as a function thereof.

* * * * *

UNITED STATES PATENT AND TRADEMARK OFFICE
CERTIFICATE OF CORRECTION

PATENT NO. : 4,193,005
DATED : March 11, 1980
INVENTOR(S) : JOSEPH MICHAEL KOS, JOHN PETER PATRICK and KERMIT IVAN HARNER It is certified that error appears in the above–identified patent and that said Letters Patent are hereby corrected as shown below:

Column 2, line 19: "is" should be -- in --

Column 7, line 28: after "rotor" insert -- speed --

Column 7, line 51: "of" should be -- or --

Column 7, line 59: "This" should be -- this --

Column 12, line 55: "generating" should be -- generator --

Column 14, line 56: "comprising" should be -- comparing --

Signed and Sealed this

Seventeenth Day of June 1980

[SEAL]

Attest:

SIDNEY A. DIAMOND

Attesting Officer

Commissioner of Patents and Trademarks